(12) United States Patent
Li et al.

(10) Patent No.: US 11,354,797 B2
(45) Date of Patent: Jun. 7, 2022

(54) METHOD, DEVICE, AND SYSTEM FOR TESTING AN IMAGE

(71) Applicant: Alibaba Group Holding Limited, George Town (KY)

(72) Inventors: Haodong Li, Hangzhou (CN); Yongliang Liu, Hangzhou (CN); Jiwu Huang, Hangzhou (CN); Qi Zhang, Hangzhou (CN)

(73) Assignee: Alibaba Group Holding Limited

( * ) Notice: Subject to any disclaimer, the term of this patent is extended or adjusted under 35 U.S.C. 154(b) by 61 days.

(21) Appl. No.: 16/804,446

(22) Filed: Feb. 28, 2020

(65) Prior Publication Data
US 2020/0279358 A1 Sep. 3, 2020

(30) Foreign Application Priority Data

Mar. 1, 2019 (CN) .......................... 201910154177.X

(51) Int. Cl.
*G06T 7/00* (2017.01)
*G06T 7/73* (2017.01)

(52) U.S. Cl.
CPC ............ *G06T 7/001* (2013.01); *G06T 7/0002* (2013.01); *G06T 7/74* (2017.01); *G06T 2207/20084* (2013.01); *G06T 2207/20092* (2013.01); *G06T 2207/20228* (2013.01)

(58) Field of Classification Search
CPC .............. G06K 9/00899; G06K 9/6272; G06T 2200/28; G06T 2207/20081; G06T 2207/20084; G06T 2207/20092; G06T 2207/20228; G06T 2207/30168; G06T 7/0002; G06T 7/001; G06T 7/74
See application file for complete search history.

(56) References Cited

U.S. PATENT DOCUMENTS

| | | | |
|---|---|---|---|
| 7,778,461 B2 | 8/2010 | Shi | |
| 9,031,329 B1 | 5/2015 | Farid | |
| 9,418,283 B1 | 8/2016 | Natarajan | |
| 10,600,238 B2 | 3/2020 | Tan | |
| 2008/0037823 A1* | 2/2008 | Shi | ............ G06K 9/527 382/100 |
| 2008/0193031 A1 | 8/2008 | Shi | |
| 2013/0089257 A1 | 4/2013 | Kim | |
| 2017/0091588 A1 | 3/2017 | Liu | |
| 2018/0101751 A1* | 4/2018 | Ghosh | ................. G06F 16/5838 |
| 2019/0156486 A1 | 5/2019 | Wang | |
| 2020/0126209 A1* | 4/2020 | Kim | .......................... G06N 3/04 |

(Continued)

FOREIGN PATENT DOCUMENTS

| | | |
|---|---|---|
| CN | 111080629 A * | 4/2020 |
| WO | 2018161298 | 9/2018 |

*Primary Examiner* — Ian L Lemieux
(74) *Attorney, Agent, or Firm* — Van Pelt, Yi & James LLP

(57) ABSTRACT

The present application discloses a method, device, and system for testing an image to assess whether the image was subject to tampering. The method includes obtaining an image, extracting residual data of the image from the image, obtaining a feature map of at least two neural layers based at least in part on the residual data of the image, obtaining a tamper probability map of the image based at least in part on the feature map, and outputting the tamper probability map or providing an indication of whether the image was subject to tampering based at least in part on the tamper probability map.

20 Claims, 6 Drawing Sheets

(56) References Cited

U.S. PATENT DOCUMENTS

| | | | |
|---|---|---|---|
| 2021/0004648 A1* | 1/2021 | Ghosh | G06N 3/08 |
| 2021/0004949 A1* | 1/2021 | Broyda | G06Q 20/389 |
| 2021/0082136 A1* | 3/2021 | Nikitidis | G06K 9/6256 |
| 2021/0209387 A1* | 7/2021 | Nikitidis | G06V 40/168 |

* cited by examiner

100

METHOD, DEVICE, AND SYSTEM FOR TESTING AN IMAGE

CROSS REFERENCE TO OTHER APPLICATIONS

This application claims priority to People's Republic of China Patent Application No. 201910154177.X entitled AN IMAGE TESTING METHOD, MEANS AND DEVICE filed Mar. 1, 2019 which is incorporated herein by reference for all purposes.

FIELD OF THE INVENTION

The present application relates to a field of image processing technology. In particular, the present application relates to a method, device, and system for testing an image.

BACKGROUND OF THE INVENTION

As digital image processing technology continues to progress, a growing number of convenient and effective image editing tools have been integrated into various kinds of image processing software. The image editing tools can be used to retouch, enhance, or even tamper with the content of digital images. For example, the image editing tools can be used to generate counterfeit images. If such counterfeit images are maliciously spread, society, the economy, politics, foreign relations, and military affairs may experience negative effects. Therefore, an image forensics technology capable of identifying tampered images is important in assuring the information security of digital media.

Traditionally, to forge an image that can be passed off as authentic, a malicious party is required to perform meticulous processing of the tampered areas to make them continuous and consistent in their color, grain, lighting, and other aspects with the original areas of the image. Therefore, image tampering has required a certain degree of professional knowledge and the expenditure of a considerable amount of time and energy. However, as image editing tools have grown more powerful, the threshold for image tampering has lowered. Digital image inpainting made performing image modification easier. The original intent of digital image inpainting technology was to repair or restore missing or contaminated areas of images. For example, digital image inpainting could be leveraged to use known content of an image to automatically deduce the content of an area in need of inpainting and fill the deduced content into the area for which inpainting was needed. Following years of development, image inpainting technology is now integrated into many image processing software programs (e.g., the Content-Aware Fill tool in Photoshop). Although image inpainting technology was not developed for the purpose of image tampering, image inpainting is a convenient technology that malicious users can use to forge images or scenes. Therefore, a need exists for the development of a forensic method directed at image inpainting technology (e.g., a method for detecting a forgery).

Traditional image inpainting algorithms can obtain relatively good results in some scenarios. However, such image inpainting algorithms still leave behind many processing traces, which can therefore be detected by an appropriate image forensics method. However, in recent years, deep learning-based image inpainting algorithms have broken through the traditional algorithm bottleneck and significantly improved image inpainting performance. Deep learning image inpainting can implement inpainting on larger areas than could the traditional image inpainting algorithms. Moreover, the content texture that is generated by the image inpainting using deep learning is richer and has a more natural visual effect. More importantly, deep learning image inpainting does not leave the processing traces that were inherent to traditional algorithms. Accordingly, most existing forensic algorithms for identifying forgeries will be ineffective.

To acquire forensic evidence of deep learning image inpainting, the related art provides some image testing methods. However, the image testing methods according to the related art are plagued by the problems of relatively low detection accuracy and efficiency.

BRIEF DESCRIPTION OF THE DRAWINGS

Various embodiments of the invention are disclosed in the following detailed description and the accompanying drawings.

DETAILED DESCRIPTION

Figure 1:
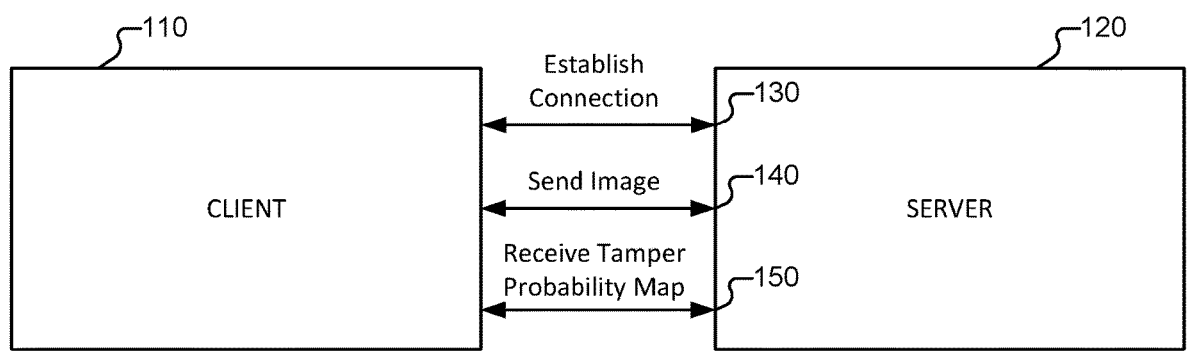
FIG. 1 is a diagram of a first application scenario according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The description below sets forth many specific details in order to facilitate full understanding of the present invention. However, the present invention can be realized in many forms other than those described here, and, without departing from the meaning of the present invention, persons skilled in the art can popularize it in similar forms. Therefore, the present invention is not limited by the specific embodiments disclosed below.

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

As used herein, a client refers to a terminal that communicates with a server. The client can be implemented on a terminal via one or more applications running on the terminal. For example, the client can refer to a mobile terminal that communicates with the server via one or more networks. The mobile terminal can run an application (e.g., a client application) that communicates with the server in connection with performing one or more operations at the mobile terminal. The client can communicate information to the server. In some embodiments, the information communicated from the client to the server includes one or more requests, etc. The client can also receive information from the server. In some embodiments, the information that the client receives from the server includes information pertaining to an image analysis performed with respect to an image. For example, the information pertaining to an image analysis includes a likelihood that a corresponding image was subject to tampering or otherwise not genuine.

According to various embodiments, a method, system, and device for performing a test with respect to an image to determine whether the image is genuine (e.g., has not been edited using an image processing technology such as inpainting, etc.) are provided. The method can be performed at least in part by a terminal. In some embodiments, the method is performed at least in part by a server. The system can include a first terminal and a second terminal, the second terminal being a server connected to the first terminal via one or more networks (e.g., the Internet). In some embodiments, the method, system, and device determine a likelihood that an image has been subject to tampering (e.g., a determination that the image being analyzed is not the original image).

FIG. 1 is a diagram of a first application scenario according to various embodiments of the present application.

Referring to FIG. 1, system 100 is provided and a scenario is depicted in connection with system 100. In various embodiments, system 100 includes client 110 and terminal 120. Client 110 can be a terminal or otherwise implemented on a terminal. Client 110 and server 120 can be connected via one or more networks. For example, client 110 and server 120 communicate information with each other via the one or more networks.

System 100 can be implemented in connection with the scenario depicted in FIG. 1. In some embodiments, system 100 implements at least part of process 300 of FIG. 3. System 100 of FIG. 1 can be implemented at least in part by network architecture 400 of FIG. 4 and/or computer system 600 of FIG. 6. System 100 can be implemented in connection with providing F1-score curves 500 of FIG. 5.

As illustrated in FIG. 1, at 130, client 110 establishes a connection with server 120. Client 110 and server 120 can be connected via one or more networks or via a direct connection. The establishing of a connection between client 110 and server 120 can include an authentication process for authenticating a user of client 110, etc. For example, client 110 can be authenticated with server 120 in connection with determining whether client 110 (or a user thereof) is registered with a service provided by server 120. In some embodiments, server 120 provides a service (e.g., a Software-as-a-Service) for determining whether an image is a genuine image. Server 120 can determine a likelihood that an image has been subject to image processing such as image inpainting (e.g., a likelihood that the image has been tampered).

At 140, an image is communicated. In some embodiments, client 110 sends an image to server 120. In some embodiments, client 110 communicates information pertaining to an image, where the information is sufficient for server 120 to obtain the image. For example, the information pertaining an image can correspond to an identifier of the image, a location at which the image is accessible (e.g., a Uniform Resource Locator), etc. If client 110 communicates information pertaining to an image, server 120 can obtain the image based at least in part on such information. For example, if the information pertaining to the image is an identifier of the image, server 120 can perform a lookup with respect to a mapping of identifiers of images to locations of images, etc. Accordingly, server 120 can use the information pertaining to the image to obtain the image. As another example, if the information pertaining to the image is a location at which the image is accessible, server 120 obtains the image from the location (e.g., server 120 communicates a request for the image to a terminal managing the location at which the image is accessible).

At 150, the image is analyzed. In some embodiments, in response to obtaining the image, server 120 analyzes the image (e.g., performs an image analysis with respect to the image). The image analysis with respect to the image can include determining a likelihood that the image is genuine, or a likelihood that the image is a forgery (e.g., that the image has been subject to image processing such as image inpainting). According to various embodiments, server 120 performs a test of the image under scrutiny. Server 120 obtains a tamper probability map with respect to the image (e.g., the image that was analyzed). The tamper probability map includes information including one or more probabilities that the image was subject to tampering.

In some embodiments, server 120 provides to client 110 information pertaining to the analysis of the image. For example, server 120 provides to client 110 an indication of whether the image has been subject to tampering (e.g., based on the analysis performed with respect to the image). As another example, server 120 provides to client 110 one or more probabilities with respect to whether the image has been subject to tampering. As another example, server 120 provides to client 110 a tamper probability map with respect to the image (e.g., the image that was analyzed).

In response to receiving the information pertaining to the analysis of the image, client 110 performs one or more corresponding operations. The one or more operations can include one or more of displaying at least a part of the information pertaining to the analysis, prevent authentication of the user from which the image is received, prevent (or limit) communication with the user from which the image is obtained, etc.

Figure 2:
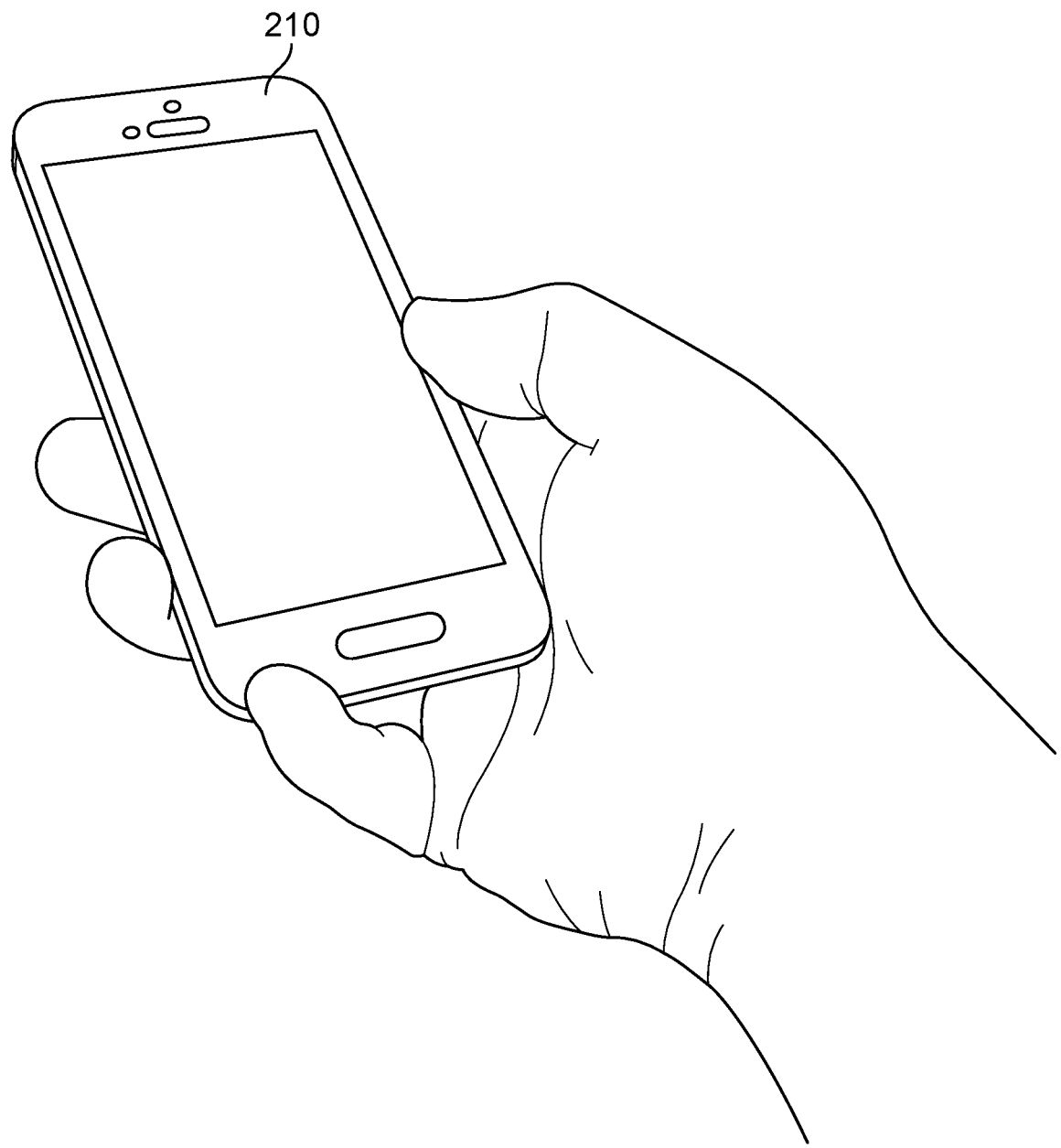
FIG. 2 is a diagram of a second application scenario according to various embodiments of the present application.

FIG. 2 is a diagram of a second application scenario according to various embodiments of the present application.

Referring to FIG. 2, terminal 200 is provided. According to various embodiments, terminal 200 corresponds to client 210 or otherwise implements client 210. For example, client 210 corresponds to one or more applications or processes that run on terminal 210. Terminal 200 can be configured to perform communication across one or more networks. For example, terminal 200 is configured to communicate with one or more servers (e.g., that provide at least one service to terminal 200).

Client 210 can be implemented in connection with the scenario depicted in FIG. 1. In some embodiments, client 210 implements at least part of process 300 of FIG. 3. Client 210 of FIG. 2 can be implemented at least in part by network architecture 400 of FIG. 4 and/or computer system 600 of FIG. 6. Client 210 can be implemented in connection with providing F1-score curves of FIG. 5.

According to various embodiments, client 210 obtains an image. For example, the image is obtained from another terminal with which terminal 200 is in communication. As another example, client 210 obtains the image from a local storage of terminal 200. As another example, client 210 obtains the image from a server. Client 210 can obtain the image in connection with receiving a service from the server, or in connection with downloading the image from a particular location (e.g., downloading an image during web browsing). As another example, client 210 obtains the image by receiving a message (e.g., a text, an email, etc.). As another example, client 210 obtains the image from a portable storage that is (temporarily) connected to terminal 200.

According to various embodiments, client 210 performs an image analysis with respect to the image. The image analysis can be performed in response to client 210 obtaining the image. In some embodiments, client 210 performs the image analysis in response to a user input. The user input can correspond to a request for client 210 to perform the image analysis. For example, terminal 200 can provide a user interface with one or more control elements and one of the one or more control elements can be configured to request image analysis in response to selection of such control element.

The image analysis with respect to the image can include determining a likelihood that the image is genuine, or a likelihood that the image is a forgery (e.g., that the image has been subject to image processing such as image inpainting). According to various embodiments, client 210 performs a test of the image under scrutiny. Client 210 obtains a tamper probability map with respect to the image (e.g., the image that was analyzed). The tamper probability map includes information including one or more probabilities that the image was subject to tampering.

In response to performing the image analysis, client 210 performs one or more corresponding operations. The one or more operations can include one or more of displaying at least a part of the information pertaining to the analysis, prevent authentication of the user from which the image is received, prevent (or limit) communication with the user from which the image is obtained, etc. In some embodiments, the one or more operations include transforming the obtained image into one or more other domains (or representations) for obtaining necessary information for the analysis. The domains can include a frequency domain, etc.

Figure 3:
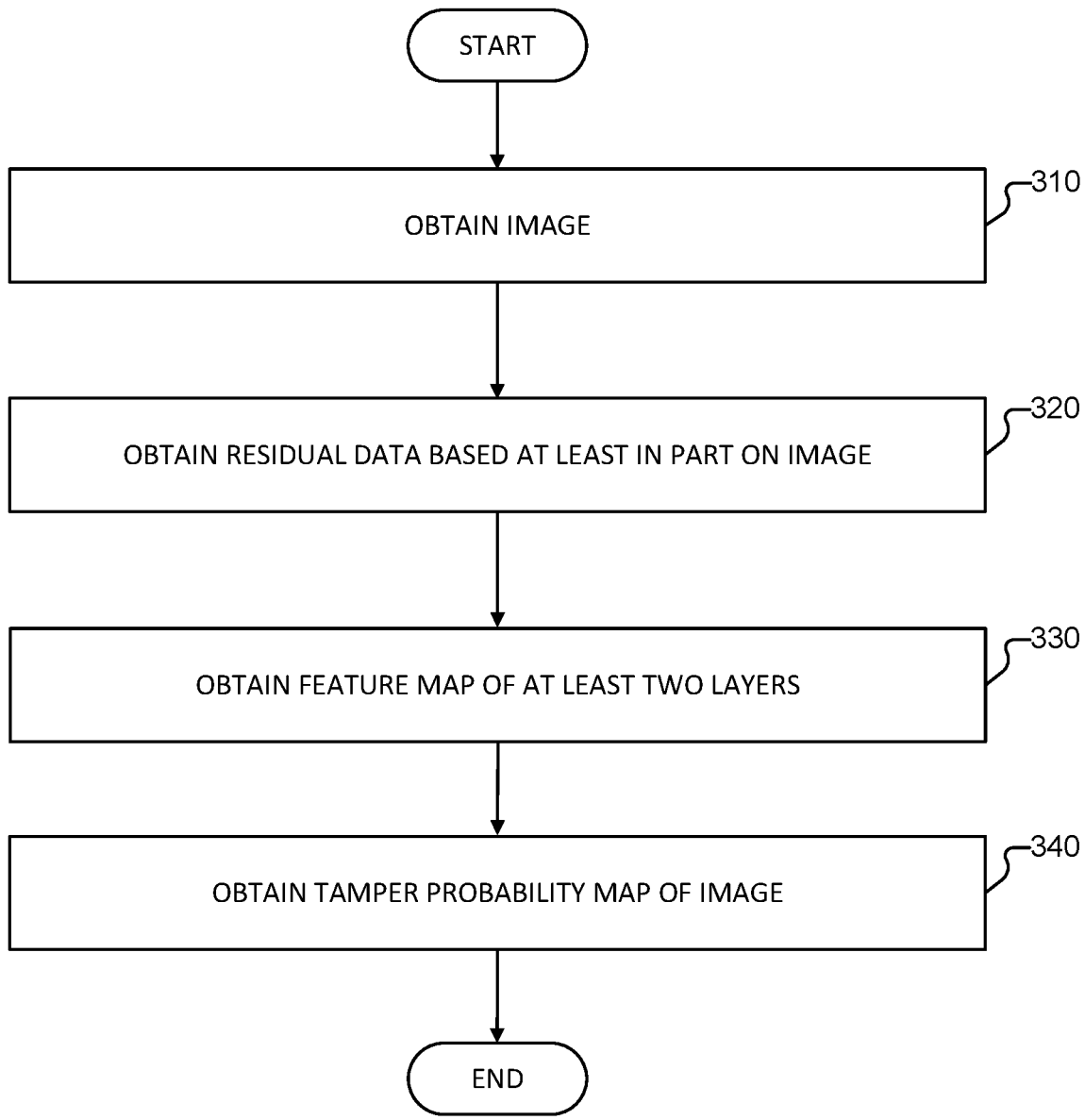
FIG. 3 is a flowchart of a method for testing an image according to various embodiments of the present application.

FIG. 3 is a flowchart of a method for testing an image according to various embodiments of the present application.

Referring to FIG. 3, process 300 is provided. Process 300 can be implemented at least in part by system 100 of FIG. 1, and/or client 210 of FIG. 2. Process 300 can be implemented at least in part using network architecture 400 of FIG. 4 and/or computer system 600 of FIG. 6. Process 300 can provide a curve of F1-score curves of FIG. 5.

In some embodiments, process 300 is implemented in response to a user input. The user input can correspond to a request for the client and/or server to perform image analysis with respect to an image. For example, a terminal can provide a user interface with one or more control elements and one of the one or more control elements can be configured to request image analysis in response to selection of such control element. In some embodiments, process 300 (or a portion thereof) is implemented in response to an image being obtained (e.g., received such as via a communication with another terminal, a download from a website, etc.).

At 310, an image is obtained (e.g., an image under scrutiny). In some embodiments, a client (e.g., a terminal or one or more applications or processes running on a terminal) obtains the image. In some embodiments, a server obtains the image (e.g., from a client via one or more networks, etc.). The image can be obtained in response to invocation of a process for analyzing an image (e.g., a request to perform a process to determine whether an image is genuine or a forgery). For example, a use or client can invoke the process for analyzing the image if the image is suspected to have been subject to tampering such as via use of a deep learning image inpainting technology.

An image under scrutiny may refer to any image. The image can be anyone of various file formats. For example, the file format of the image can be any one of Joint Photographic Experts Group (JPEG), Tagged Image File Format (TIFF), Windows bitmap (BMP), Portable Network Graphics (PNG), Graphics Interchange Format (GIF), etc. Various other file formats can be implemented. The image under scrutiny refers to an image that is suspected to have been subject to tampering using image processing such as deep learning image inpainting technology.

At 320, residual data is obtained based at least in part on the image. In some embodiments, the obtaining the residual data comprises extracting the residual data using one or more predefined image analysis processes. The residual data can be obtained by the terminal performing the image analysis. As an example, in the case of the server performing the image analysis to determine whether the image has been subject to tampering, the server obtains the residual data. As another example, in the case of a client (e.g., corresponding to, or running on, a terminal), the client obtains the residual data.

The extracting of the residual data includes performing a filter processing on the image, and obtaining the residual data based on the filtered image (e.g., the resulting image of the filter processing). The filter processing can be implemented by performing any types of high-pass filtering on the images. For example, the image can be processed by a Gaussian high-pass filter or a derivative based filter.

With respect to an image that has been subject to tampering based at least in part on deep learning image inpainting, tampered areas of the image are usually extremely close in terms of image content to the original areas of an image. Various embodiments include suppressing image content (e.g., image content of the original image before being subject to tampering) in order to heighten the traces left by the tampering (e.g., the image inpainting). The suppressing of the image content can be implemented by applying the image to a filter processing (e.g., passing the image through a predefined filter). In some embodiments, a high-pass filter is used in connection with the filtering processing. The residual data can correspond to an output from applying the high-pass filter on the image. In some embodiments, the output from the filter processing (e.g., the filtered residual data) is used as input for a next stage in image analysis (e.g., the network of the next layer).

In some embodiments, performing a filter processing and obtaining the residual data with respect to filtered image includes performing a filtering of the image using one or more difference filters. According to various embodiments, the one or more difference filters have filters orientated in different directions. In some embodiments, the one or more difference filters filter input data (e.g., the image under scrutiny) with respect to different characteristics that are to be filtered. The output from the one or more difference filters can be the residual data with respect to the filtered image.

Filtering the image using the one or more difference filters includes performing one or more operations with respect to the image. For example, the one or more difference filters are respectively applied to the image. In some embodiments, the one or more difference filters are applied serially (e.g., each subsequent one of the one or more difference filters uses an output from the previous difference filter as an input to such subsequent difference filter). The applying the one or more difference filters to the image can include individually subjecting different color channels of the image under scrutiny to convolution operations (e.g., convolution operations corresponding to the difference filter(s)), and obtaining convolution operation results for the different color channels of the image under scrutiny. The residual data obtained based at least in part on the image can correspond to the output from the one or more difference filters (e.g., the individual outputs from the one or more difference filters, or the output from the collective one or more difference filters). For example, the residual data can correspond to the convolution operation results for the different color channels.

Figure 4:
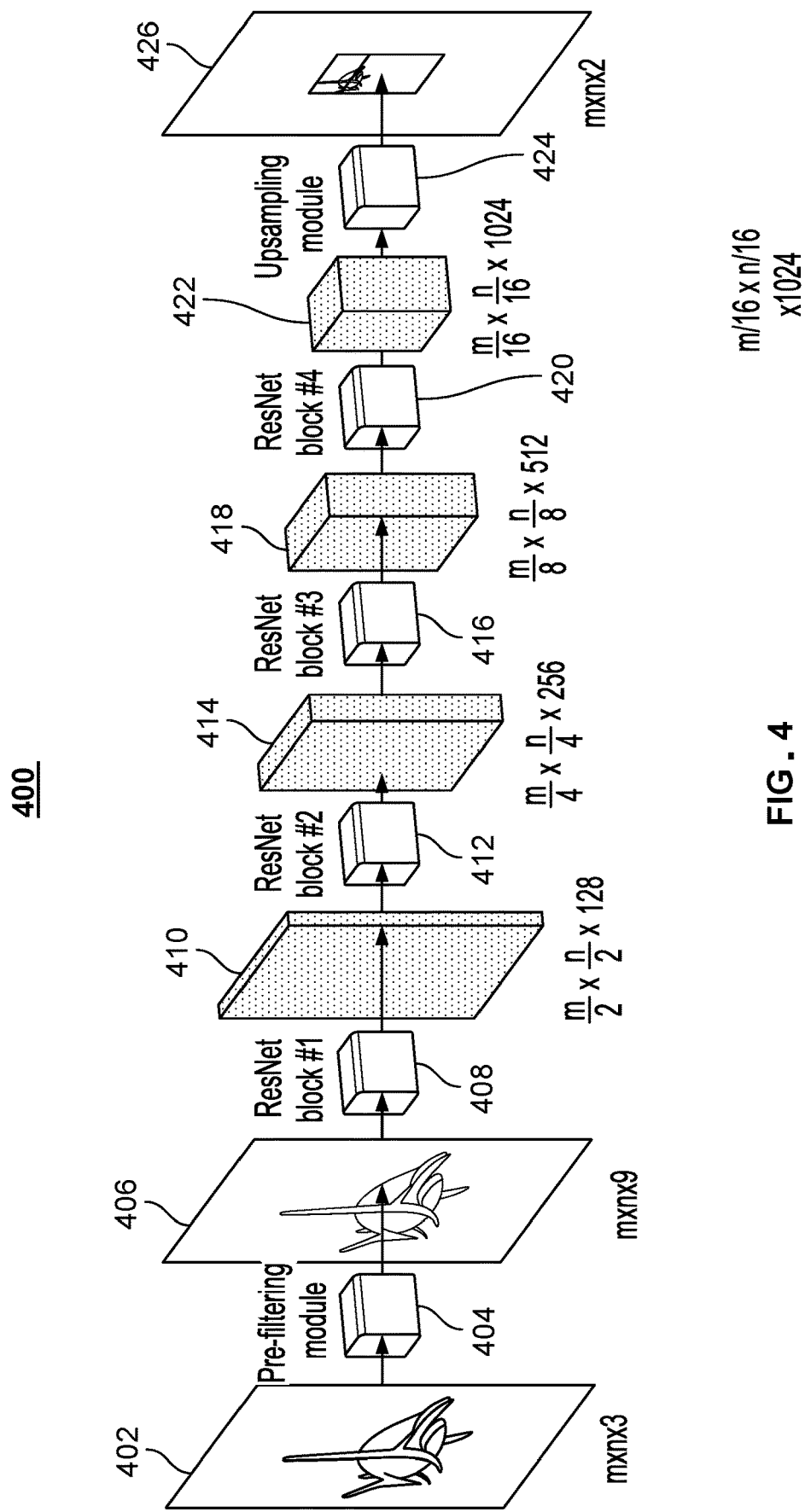
FIG. 4 is a diagram of a network architecture for testing an image according to various embodiments of the present application.

FIG. 4 is a diagram of a network architecture for testing an image according to various embodiments of the present application.

Referring to FIG. 4, network architecture 400 for testing an image is provided. Network architecture 400 can be implemented at least in part by system 100 of FIG. 1, and/or client 220 of FIG. 2. Network architecture 400 can be implemented in connection with process 300 of FIG. 3. Network architecture 400 can be implemented at least in part by computer system 600 of FIG. 6. In some embodiments, network architecture 400 is implemented in connection with providing F1-score curves 500 of FIG. 5.

As illustrated in FIG. 4, the image (e.g., the image under scrutiny that is obtained and subject to analysis to determine if the image was subject to tampering) 402 is input to a pre-filtering module 404. Pre-filtering module 404 can be implemented on a client or a server. For example, pre-filtering module 404 is implemented in software as a pre-defined function or set of operations. In some embodiments, pre-filtering module 404 is used to extract residual data of the image under scrutiny from the image under scrutiny.

In some embodiments, pre-filtering module 404 uses a high-pass filter to subject the image under scrutiny to filter processing. Pre-filtering module 404 can include the high-pass filter, or provide the image to a high-pass filter module that performs the filtering on the image. Residual data 406 (also referred to herein as the filtered residual data) is an output from pre-filtering module 404.

Residual data 406 is an input to another layer in a residual network used for processing the image. For example, residual data 406 is input to the residual network block 1 (module 408). In some embodiments, residual network block 1 (module 408) is implemented in software as a predefined function or set of operations. According to various embodiments, the residual network used for processing the image (or the residual data of the filtered image) comprises one or more residual network blocks. As illustrated in FIG. 4, the one or more residual network blocks can be implemented in serial such that the manner the output from one residual network block is used as an input to a subsequent residual network block.

In some embodiments, three groups of difference filters of different directions (e.g., vertical, horizontal, 45 degrees) are used to process color channels of the image under scrutiny. For example, the three groups of differences filters are used to subject the red, green, and blue channels (e.g., the R, G, and B channels) of the image under scrutiny to convolution operations. Residual data of the image under scrutiny is obtained based on the results of the convolution operation(s).

Referring again to process 300 of FIG. 3, at 330, a feature map of at least two layers is obtained. In some embodiments, the client or the server obtains the feature map. A feature map refers to a function that maps the input to a feature space. The feature map can be obtained with respect to residual data that is obtained based at least in part on the image. In some embodiments, the obtaining the feature map includes subjecting the residual data (e.g., residual obtained based on the filtering processing performed on the image) to two or more layers of further processing. Each layer includes certain processing functions such as normalization, non-linear processing, convolution, etc.

According to various embodiments, a four-layer feature map is preferred. For example, the results from a three-layer feature map are less ideal than the four-layer feature map (e.g., the three-layer feature map generally performs less well with respect to test performance). Further, the marginal cost of processing with respect to a four-layer feature map is not too burdensome, particularly in view of the improvement in the results of the four-layer feature map as compared to the results of the three-layer feature map. Conversely, although the results of the five-layer feature map are better than the four-layer feature map, the marginal cost of processing with respect to a five-layer feature map is relatively burdensome in view of the marginal improvement in the results of the five-layer feature map as compared to the results of the three-layer feature map. To achieve a balance between testing performance and calculation complexity, a feature map of four layers based on the residual data of said image under scrutiny is implemented.

The extraction of a multi-layer feature map achieves the integration of shallow features with deep features and overcomes a deficiency of image processing methods of the related art. In particular, the use of a multi-layer feature map according to various embodiments overcomes the deficiency associated with the use of single-size image patches used by image processing method of the related art.

The obtaining the feature map of at least two layers can be based at least in part on the residual data of the image (e.g., the image under scrutiny). According to various embodiments, the obtaining a feature map of at least two layers based on residual data includes performing convolution processing with respect to input data of a current layer to obtain a first feature map. In the case of the current layer being the first layer, the input data of the current layer is the residual data. For example, with reference to FIG. 4, the first layer processing is performed at residual network block 1 module 408 and the input to the current layer is residual data 406. In the case of the current layer being another layer (e.g., a subsequent layer in the residual network such as residual network block 2 module 412), the input to the current layer is data (e.g., data 410) corresponding to an output of the previous layer (e.g., residual network block 1 module 408).

In some embodiments, the obtaining a feature map of at least two layers based on residual data further includes adding the input data of the current layer and the last convolutional output of corresponding module (e.g., the output of Conv4 in block 1 module 408, the output of Conv7 in block 1 module 408, the output of Conv10 in block 2 module 412, etc.). For example, the obtaining a feature map of at least two layers based on residual data further includes adding the input data of the current layer and the first feature map to obtain a feature map of the current layer. The adding of the input data to the first feature map can be used in connection with adjusting the resolution or number of channels (e.g., of color) of the input data. In some embodiments, the input data does not always have the same resolution and/or channel as the last convolutional output of each unit. Therefore, when adding the input data with the last convolutional output together, the resolution or number of channels of the input data is adjusted, if necessary.

According to various embodiments, the obtaining a feature map of at least two layers based on residual data includes performing a normalization and/or non-linear processing with respect to the input data. For example, before convolution processing is performed with respect to the input data to the current layer input data to obtain a first feature map, a normalization and/or non-linear processing with respect to the input data is performed. The normalization operation can include dividing each input data element by the range of all elements in the input. The non-linear processing applies a weighted filter to its input. The normalization and/or non-linear processing can include using pre-batch normalization and/or pre-activation processes. In some embodiments, the normalization and/or non-linear processing are performed with respect to the input data in the current layer, then the normalized and non-linear processed input data are subject to the convolution processing (e.g., by applying a convolutional filter to the normalized and/or non-linear processed input data) to obtain a first feature map.

In some embodiments, batch normalization is a process for normalizing activations in intermediate layers of deep neural networks. For example, batch normalization is a process for standardizing the inputs to a network, applied to ether the activations of a prior layer or inputs directly. In a neural network, batch normalization is achieved through a normalization step that fixes the means and variances of each layer's inputs. Ideally, the normalization would be conducted over the entire training set, however use of the global information for batch normalization is inefficient. Thus, batch normalization is performed with respect to mini-batches in the training process.

In some embodiments, pre-activation processes include determining pre-activation values to a current layer in the neural network. For example, the pre-activation value can be based at least in part on a weighted sum of the inputs from the previous layer plus a bias. The pre-activation processes can include determining the weighted sum and the bias used in connection with determining a pre-activation value for a layer.

According to various embodiments, if a resolution of the input data is determined to be different from a resolution of the first feature map, or if the input data differs from the first feature map with respect to number of channels, the input data is processed with respect to the resolution or the number of channels to obtain processed input data; and the processed input data is to the first feature map to obtain the current-layer feature map. The processing of the input data with respect to the resolution or the number of channels can include processing the input data in a manner to obtain processed input data that has the same resolution and/or number of channels as the first feature map. In some embodiments, the processing of the input data with respect to the resolution or the number of channels can include processing the input data in a manner to obtain processed input data that has the same resolution and/or number of channels as the first feature map includes a max pooling operation or a convolution kernel of predetermined dimensions operation. The max pooling operation can be used to adjust the resolution. The processing using a convolutional kernel of predetermined dimensions (e.g., dimensions of 1×1) can be used to adjust the number of channels. Table 1 hereof illustrates the processing using the convolutional kernel of predetermined dimensions. Modules and their respective layers are specified. Add# in the table indicates a residual network shortcut. For example, "Add2 (w/Add1)" represents adding the output results of the previous layer Conv7 to the output results of Add1. If two objects added to each other have different numbers of channels, the number of channels (e.g., the number of channels before the summing) are adjusted using a 1×1 convolution. If two objects added to each other have different spatial dimensions, the dimensions (e.g., the dimensions before the summing) are adjusted using a max pooling operation. A residual network shortcut can correspond to a manner of connecting layers. For example, the residual network shortcut can correspond to the connection between the input data of the current module and the last convolutional output of the module (e.g., the previous module). The residual network shortcut helps the network to obtain good performance while stacking more layers.

According to various embodiments, the performing convolution processing with respect to input data of a current layer to obtain a first feature map includes using three convolutional layers to subject the input data of the current layer to convolution processing to obtain a first feature map.

Referring back to network architecture 400 of FIG. 4, a residual network block includes two units, and each of the two units of the residual network block performs convolution processing to the input data based at least in part on using three convolutional kernels. The convolutional kernels are tensors that act as convolutional weights. For example, a 3×3 convolution kernels has 9 elements. The values of the elements are initialized randomly. For example, the convolution processing data with respect to the input data includes using the three convolution kernels in succession to obtain the first feature map. The three convolution kernels can have dimensions of 1×1, 3×3, and 1×1, respectively.

As illustrated in FIG. 4, four cascaded residual network blocks (e.g., residual network block 1 module 408, residual network block 2 module 412, residual network block 3 module 416, residual network block 4 module 420) are used to obtain a feature map based at least in part on the on residual data of the image under scrutiny. The processing of the residual data of the image under scrutiny using the four cascaded residual network blocks can provide a feature map of four layers (e.g., each residual network block corresponding to a layer of the feature map).

The input data of residual network block 1 (e.g., ResNet block #1) is residual data of an m×n×9 image under scrutiny, and the output is an m/2×n/2×128 feature map 410 (e.g., a first-layer feature map). For example, the pre-filtering module 404 processes image under scrutiny having a dimension of m×n×3. The output from the pre-filtering module 404 is the residual data 406 having a dimension of m×n×9.

The input data of residual network block 2 module 412 (e.g., ResNet block #2) is the output of residual network block 1 module 408 (e.g., the output being the m/2×n/2×128 feature map 410). The output from residual network block #2 module 412 is an m/4×n/4×256 feature map 414 (e.g., second-layer feature map).

The input data of residual network block 3 module 416 (e.g., ResNet block #3) is the output of residual network block 2 module 412 (e.g., the output being the m/4×n/4×256 feature map 414), and the output is an m/8×n/8×512 feature map 418 (e.g., third-layer feature map).

The input data of residual network block 4 module 420 (e.g., ResNet block #4) is the output of residual network block 3 module 416 (e.g., the output being the m/8×n/8×512 feature map 418), and the output is an m/16×n/16×1024 feature map 422 (e.g., fourth-layer feature map).

According to various embodiments, the network architecture for testing an image (e.g., testing for a likelihood of tampering) can provide a feature map. For example, the feature map can be determined based at least in part on a four-layer network architecture, in which each layer of the network architecture comprises a residual network block. The end result of using four cascaded residual network blocks can be an m/16×n/16×1024 feature map. For example, the end result using network architecture 400 is m/16×n/16×1024 feature map 422.

According to various embodiments, one or more of the residual network blocks (e.g., residual network block 1 408, residual network block 412, residual network block 416, and/or residual network block 420) subjects input data of the corresponding layer to convolution processing. A feature map is obtained from the processing of each of the one or more residual network blocks with respect to input data to the corresponding one or more network blocks. The convolution processing can use three convolutional kernels (e.g., with dimensions of 1×1, 3×3, and 1×1) in succession to obtain the first feature map. In some embodiments, before each convolution, batch normalization and ReLU non-linear activation processing is performed with respect to the data. The batch normalization is performed to speed up the convergence of training process. The ReLU non-linear activation processing is performed to bring nonlinearity into the network. After batch normalization and ReLU non-linear activation processing is performed with respect to the input data to the one or more of the residual network blocks, the processed input data (e.g., data input to a unit of the corresponding residual network blocks) is subjected to 1×1 convolution and max pooling operations to obtain a feature map having a resolution and number of channels that are the same. The processed input data is added to the feature map obtained by convolution, and the result serves as the feature map outputted by the unit (e.g., a unit of the corresponding residual network block). As an example, if the unit is the second unit of a residual network block, a convolution whose stride is 2 is also used during output to reduce the spatial dimensions of the feature map by half. As an example, a convolution with stride 2 skips 1 step in 2 steps when performing the convolution operation on the feature map. According to such an example, in this way, the spatial dimensions are reduced by half. Please note that the composition and parameter settings of the residual network block in FIG. 4 are just one example. During specific implementation, different settings may be used for the number of units, the convolutional kernel size of each convolutional layer, and the number of output channels. Table 1 includes parameter settings according to various embodiments. Various other parameter settings can be used for other implementations.

TABLE 1

| Module | Layer name | Kernel size | Channel | Stride | BN | Activate |
|---|---|---|---|---|---|---|
| Pre-filtering (404) | Conv1(depth-wise) | 3 × 3 | 9 | /1 | — | — |
| ResNet Block 1 (408) unit 1 | Conv2 | 1 × 1 | 32 | /1 | Y | ReLU |
| | Conv3 | 3 × 3 | 32 | /1 | Y | ReLU |
| | Conv4 | 1 × 1 | 128 | /1 | Y | ReLU |
| | Add1(w/Conv1) | — | 128 | — | — | — |
| ResNet Block 1 (408) unit 2 | Conv5 | 1 × 1 | 32 | /1 | Y | ReLU |
| | Conv6 | 3 × 3 | 32 | /1 | Y | ReLU |
| | Conv7 | 1 × 1 | 128 | /2 | Y | ReLU |
| | Add2(w/Add1) | — | 128 | — | — | — |
| ResNet Block 2 (412) unit 1 | Conv8 | 1 × 1 | 64 | /1 | Y | ReLU |
| | Conv9 | 3 × 3 | 64 | /1 | Y | ReLU |
| | Conv10 | 1 × 1 | 256 | /1 | Y | ReLU |
| | Add2(w/Add1) | — | 256 | — | — | — |
| ResNet Block 2 (412) unit 2 | Conv11 | 1 × 1 | 64 | /1 | Y | ReLU |
| | Conv12 | 3 × 3 | 64 | /1 | Y | ReLU |
| | Conv13 | 1 × 1 | 256 | /2 | Y | ReLU |
| | Add4(w/Add3) | — | 256 | — | — | — |
| ResNet Block 3 (416) unit 1 | Conv14 | 1 × 1 | 128 | /1 | Y | ReLU |
| | Conv15 | 3 × 3 | 128 | /1 | Y | ReLU |
| | Conv16 | 1 × 1 | 512 | /1 | Y | ReLU |
| | Add5(w/Add4) | — | 512 | — | — | — |
| ResNet Block 3 (416) unit 2 | Conv17 | 1 × 1 | 128 | /1 | Y | ReLU |
| | Conv18 | 3 × 3 | 128 | /1 | Y | ReLU |
| | Conv19 | 1 × 1 | 512 | /2 | Y | ReLU |
| | Add6(w/Add5) | — | 512 | — | — | — |
| ResNet Block 4 (420) unit 1 | Conv20 | 1 × 1 | 256 | /1 | Y | ReLU |
| | Conv21 | 3 × 3 | 256 | /1 | Y | ReLU |
| | Conv22 | 1 × 1 | 1024 | /1 | Y | ReLU |
| | Add7(w/Add6) | — | 1024 | — | — | — |
| ResNet Block 4 (420) unit 2 | Conv23 | 1 × 1 | 256 | /1 | Y | ReLU |
| | Conv24 | 3 × 3 | 256 | /1 | Y | ReLU |
| | Conv25 | 1 × 1 | 1024 | /2 | Y | ReLU |
| | Add8(w/Add7) | — | 1024 | — | — | — |
| Upsampling | Conv26(transpose) | 8 × 8 | 64 | ×4 | — | — |
| | Conv27(transpose) | 8 × 8 | 4 | ×4 | | |
| | Conv28 | 5 × 5 | 2 | /1 | Y | ReLU |

Referring back to FIG. 3, at 340, a tamper probability map of the image is obtained. In some embodiments, the client or the server obtains the feature tamper probability map of the image. The tamper probability map can be obtained based at least in part on the feature map. The tamper probability map can indicate whether at least part of the image was subject to tampering or is otherwise not genuine. For example, the tamper probability map can indicate (or be based on) likelihood that at least part of the image was subject to tampering or is otherwise not genuine.

In some embodiments, information is provided based at least in part on the tamper probability map of the image. The information provided based at least in part on the tamper probability map of the image can include the tamper probability map. In some embodiments, the terminal provides to a user the information based at least in part on the tamper probability map of the image. The information includes an indication of likelihood that the image has been subject to tampering (e.g., a determination that the image being analyzed is not the original image). In some embodiments, the image is determined to have been subject to tampering based at least in part on the tamper probability map. In some embodiments, in response to a determination that the image has been subject to tampering, an indication is provided to a user (e.g., via a user interface). In some embodiments, in response to a determination that the image has been subject to tampering, an authentication or validation (e.g., of the user) is denied. In some embodiments, in response to a determination that the image has not been subject to tampering, an authentication or validation (e.g., of the user) is confirmed.

In some embodiments, the tamper probability map refers to the results from subjecting an image under scrutiny to tamper detection and localization. In some embodiments, each element in the tamper probability map is used to indicate a probability that a corresponding pixel (or area) in the image under scrutiny has been subject to tampering or is otherwise not genuine. When the image under scrutiny is fed to the network, the network outputs a tamper probability map in which the tampered pixels and the original pixels have different responses. In this way, the tampered area within the image can be recognized. In some embodiments, the tamper probability map is obtained by inputting the image into the system (e.g., the neural network).

According to various embodiments, the obtaining a tamper probability map of the image (e.g., the image under scrutiny) based at least in part on the feature map comprises: performing upsampling processing with respect to the feature map to obtain a tamper probability map of the image (e.g., the image under scrutiny). The upsampling processing includes one or more transposed convolutions. For example, if the resolution of the feature map is 1/16 of the input image, the feature map can be upsampled by a transposed convolution with a factor of 16 times, or it can be unsampled by two successive transposed convolutions with the factor of 4 times.

In some embodiments, the feature map obtained at 330 (e.g., and used to obtain the tamper probability map) is a relatively deep-layer feature map, and its resolution is greatly reduced relative to the obtained image (e.g., the image under scrutiny). Therefore, when a tamper probability map of the image under scrutiny is obtained based at least in part on the feature map, upsampling processing is performed with respect to the feature map to obtain a tamper probability map of the image under scrutiny. In some embodiments, the resolution of the tamper probability map and the resolution of the image under scrutiny are the same. If the resolution of the tamper probability map and the resolution of the image under scrutiny are the same, upsampling processing does not need to be performed with respect to the feature map. If the feature map is of multiple channels, the feature map is processed to obtain a two-channel tamper probability map. Usually, a simple convolution operation can be performed with respect to the feature map to obtain the two-channel tamper probability map.

In some embodiments, the upsampling processing (e.g., with respect to the feature map) includes using a transposed convolutional layer in connection with upsampling the feature map. The convolutional kernel of the transposed convolutional layer can be set to parameters corresponding to bilinear interpolation. The convolutional kernel dimensions of the transposed convolutional layer can be twice the upsampling factor. For example, the length and width of the convolutional kernel of the transposed convolutional layer are twice the upsampling factor. As a further example, if the feature map obtained at 330 corresponds to a feature map of m/16×n/16×1024, to obtain a tamper probability map with the same resolution as the image under scrutiny, the upsampling factor is 16 times, and the convolutional kernel of the transposed convolutional layer is a convolutional kernel of 32×32.

When the upsampling factor is relatively large, a very large convolutional kernel is used with respect to the upsampling if only one upsampling is to be performed. Therefore, various embodiments include performing an upsampling process with respect to the feature map two or more times to obtain a tamper probability map of the image under scrutiny. The product of the upsampling factors of the upsampling sub-processing performed two or more times is the upsampling factor of the upsampling processing. For example, if the upsampling factor is 16, the feature map may undergo four-factor upsampling sub-processing twice. As another example, if the upsampling factor is 16, the feature map may undergo two-factor upsampling sub-processing four times.

According to various embodiments, the upsampling processing with respect to the feature map does not increase the information of the feature map. Increasing the information can correspond to providing more useful evidence for determining whether the pixels in the image are tampered or not. Because upsampling only perform interpolation among adjacent positions, it does not increase the information. Because the upsampling processing will not increase the information, the number of channels outputted by the upsampling module (e.g., upsampling module 424 of network architecture 400 of FIG. 4) can be set so that the total volume of the feature map data remains the same before and after upsampling. The volume of the feature map data is determined based on the total number of elements in the feature map.

In some embodiments, the performing upsampling with respect to the feature map to obtain a tamper probability map of the image (e.g., image under scrutiny) includes performing upsampling processing with respect to the feature map to obtain an upsampled feature map, and performing a convolution operation on the upsampled feature map to obtain a tamper probability map of the image (e.g., the image under scrutiny).

A transposed convolution can result in a checkerboard effect being exhibited by the data (e.g., the corresponding image such as a being manifested in a tamper probability map for the image) under some conditions. In some embodiments, the checkerboard effect checkerboard effect is a natural side-effect of transposed convolution, which is introduced by the uneven overlap when the filter kernel size is not divisible by the stride. Because transposed convolution may give rise to a checkerboard effect under some conditions, a convolution operation can be performed with respect to an upsampled feature map to obtain the tamper probability map of the image under scrutiny. The performing the convolution operation with respect to the feature map (e.g., the upsampled feature map) is used to alleviate the adverse visual effects from the checkerboard effect in the outputted tamper probability map. For example, the purpose of the extra convolution operation can be to blur the checkerboard effect.

Related art primarily uses two methods to determine forensic evidence of deep learning image inpainting for test images: (a) a combination of hand-crafted forensic features and sliding window, and (b) combination of image patch classification-oriented convolution neural network (CNN) network and sliding window.

With respect to the use of a combination of hand-crafted forensic features and sliding window, according to the some forensic technology, statistical features extracted on the basis of image residue have a certain degree of universality for the vast majority of tampering methods. Therefore, statistical features extracted on the basis of image residue can be used to detect deep learning image inpainting. In the model training stage, an image is split into several smaller image patches. Features are separately extracted from the original image patches and the inpainted image patches, and the classifier is trained. In the testing stage, the image is split into mutually overlapping smaller patches, and features are sequentially extracted from each image patch using the sliding window approach. The features are input into the trained classifier to obtain probability of an image page being an inpainted patch (tamper probability) for a corresponding image patch. The probability of an image patch being an inpainted image can be obtained for each image patch for the image. The results from all image patches are combined into a tamper probability map. The tamper probability map can be binarized and used as a test result.

With respect to the combination of image patch classification-oriented CNN network and sliding window, according to some technology, features that have more differentiating capability can be learned in the context of a deep network than is the case with hand crafted features. Therefore, a CNN network that classifies small image patches can be trained to detect deep learning image inpainting. In the training stage of a system using a CNN network, the original image patches and the inpainted image patches in the image are inputted into the CNN network as two classes of samples. The network is enabled through supervised learning to differentiate original image patches from inpainted image patches. The supervised learning includes the process that determines the values of the parameters within the network. A training dataset including input data (image patches) and corresponding labels is needed for such a process. The supervised learning algorithm attempts to optimize the network parameters based on the training dataset so that the network can make predictions of the labels for new input data. In the testing stage, a set of image patches is sequentially input into the trained network with the same sliding window approach to obtain the tamper probability of each image patch in the set of image patches. The set of image patches can include all image patches constituting an image. A tamper probability map is generated based at least in part on the results with respect to the set of image patches (e.g., each image patch). The tamper probability map can be a combination of each image patch for an image. In response to obtaining the tamper probability map, the tamper probability map is binarized, the result of which can be used as the test results.

Related art methods for testing images in connection with determining a likelihood of tampering using forensic evidence of deep learning image inpainting suffers several deficiencies. Two primary drawbacks of such related methods include a relative lack of testing performance and a relatively low testing efficiency. The testing performance negatively impacted by the unvaried approach to splitting images into image patches. If the image patches are too large, testing resolution is relatively low, and identification of small-scale inpainting areas can be difficult. Conversely, if the image patches are too small, the feature-extracting areas are limited, and obtaining a good feature representation is difficult or impossible, thereby resulting poor testing accuracy. The testing efficiency is negatively impacted by the sliding window-based testing. For example, the sliding window-based testing results in an increased memory expenditure based on use of a sliding window to process overlapped image patches. As another example, the testing efficiency is negatively impacted based on a result of unnecessary operations caused by the large volume of repeated pixels in adjacent image patches.

Various embodiments implement a convolutional network architecture such as network architecture 400 of FIG. 4. An image under scrutiny is input into the convolutional network architecture and a tamper probability map of the image under scrutiny is output. Testing according to various embodiments (e.g., using convolutional network architecture) can avoid the use of the sliding window approach. Therefore, it testing efficiency is significantly increased relative to the related art methods for testing images. By extracting feature maps in multiple layers, various embodiments achieve an integration of shallow-layer features with deep-layer features and overcomes a deficiency of related art methods for testing images, namely the use of single-size image patches.

Figure 5:
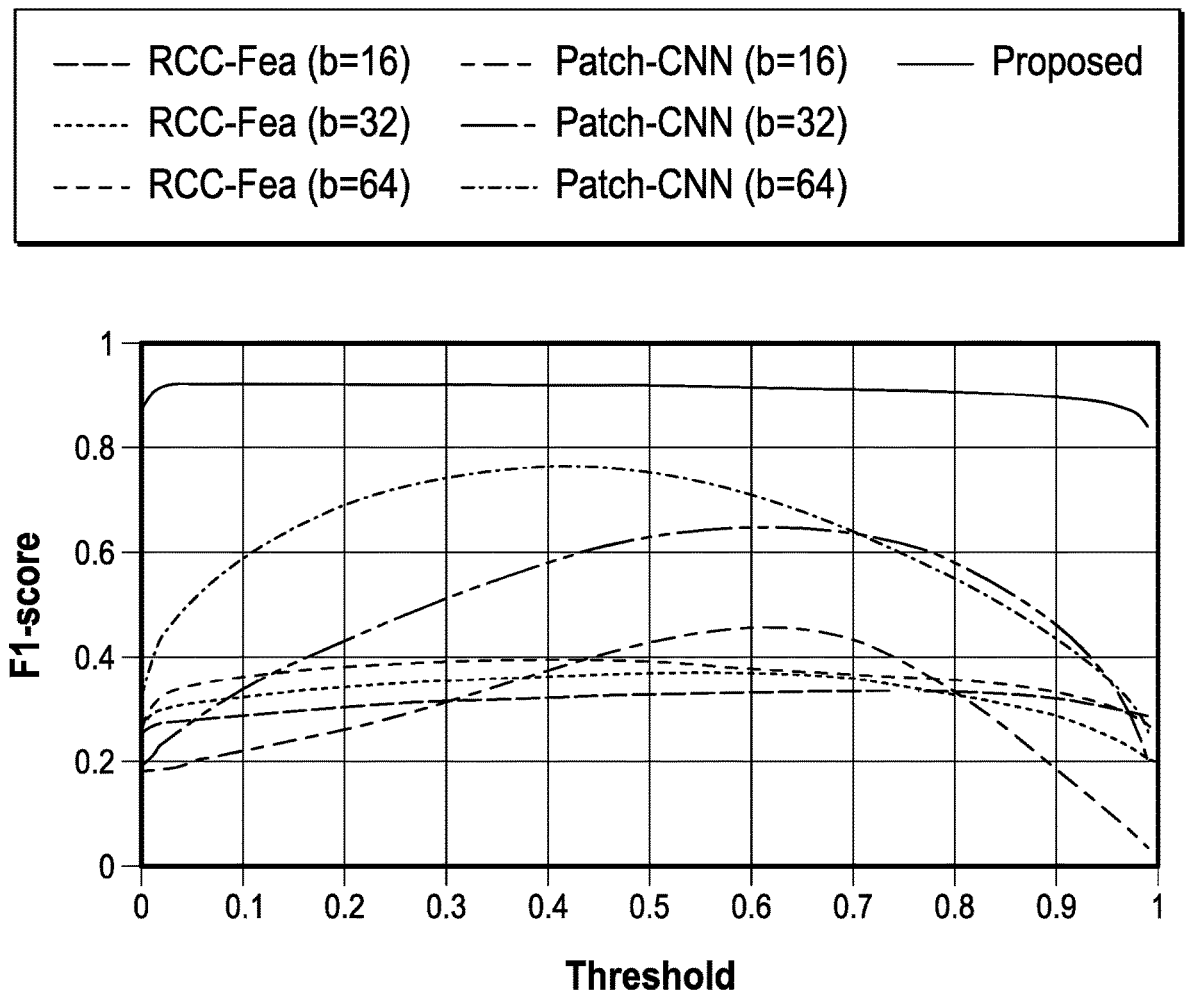
FIG. 5 is F1-score curves of each scheme different threshold values according to various embodiments of the present application.

FIG. 5 is F1-score curves of each scheme different threshold values according to various embodiments of the present application.

Referring to FIG. 5, F1-score curves 500 are provided. The F1-score curves 500 can provide a comparative example of results using implementations for testing an image according to various embodiments and results using implementations for testing an image according to related art methods.

F1-score curves 500 can be obtained in connection with process 300 of FIG. 3. F1-score curves 500 can be obtained at least in part by system 100 of FIG. 1, and/or client 210 of FIG. 2. F1-score curves 500 can be obtained in connection the use of network architecture 400 of FIG. 4 and/or computer system 600 of FIG. 6.

F1-score curves 500 illustrate results of a testing an image based at least in part on network architecture 400 of FIG. 4. As illustrated in FIG. 5, the F1-score curves 500 exhibit the outstanding performance of various embodiments. The comparative test used to obtain F1-score curves 500 is further described below.

The comparative test was performed using a JPEG image in ImageNet with a compression quality of 75. 50,000 images were randomly selected as a training set, and 10,000 images were additionally randomly selected as a testing set. 10% rectangular areas located at the center of these images underwent inpainting using the deep learning image inpainting algorithm described in the paper "Globally and Locally Consistent Image Completion" (ACM TOG 2017), the disclosure of which is hereby incorporated herein in its entirety. The images were saved as JPEG images using the same quality (75) as the original images. For a contrast with traditional testing methods, a group of co-occurrence matrices extracted from image residue of varying color components was selected to serve as hand-crafted features (color residual features), and the upsampling module of the proposed scheme was replaced with a global average pooling layer and fully-connected layers to achieve the transformation into an image patch classification-oriented CNN network (patch CNN). Table 2 presents test results for each scheme obtained from binarized tamper probability maps using the default threshold value (0.5). As illustrated in Table 2, the implementation of an embodiment exhibits superior performance in comparison to the traditional methods with which it is compared in respect of recall, precision, Intersection-over-Union (IoU), F1-score, and other such pixel-wise measurement criteria. FIG. 5 depicts F1-score curves of each scheme across different threshold values. F1-score curves 500 that the performance of the proposed scheme is significantly better than the other methods at various threshold values.

TABLE 2

| Scheme | Color residual features | | | Patch CNN | | | Implementation of an Embodiment |
|---|---|---|---|---|---|---|---|
| | b = 16 | b = 32 | b = 64 | b = 16 | b = 32 | b = 64 | |
| Recall | 70.30 | 67.83 | 63.13 | 74.29 | 79.21 | 73.52 | 89.83 |
| Precision | 25.72 | 31.94 | 37.51 | 34.53 | 57.64 | 83.22 | 95.70 |
| IoU | 20.86 | 24.18 | 26.62 | 28.57 | 47.66 | 62.62 | 86.43 |
| F1-score | 33.03 | 36.79 | 38.88 | 42.83 | 62.56 | 75.15 | 91.98 |

Furthermore, the testing-stage runtimes were compared for different schemes. Table 3 provides the average runtime required by each scheme per image when testing 10,000 test images. The configuration used for the color residual features scheme was run on a computing cluster configured with an Intel Xeon CPU (2.20 GHz) using 100 CPU cores running in parallel. The patch CNN scheme and the proposed scheme (e.g., an implementation of various embodiments described herein) were run on an Nvidia Tesla P100 GPU. As illustrated in Table 3, the implementation of an embodiment requires no more than approximately 0.1 second on the average to test one image. This is much faster than the other comparative schemes provided in Table 3.

TABLE 3

| Scheme | Color residual features | | | Patch CNN | | | Implementation of an Embodiment |
|---|---|---|---|---|---|---|---|
| | b = 16 | b = 32 | b = 64 | b = 16 | b = 32 | b = 64 | |
| Runtime (s) | 5.04 | 5.46 | 7.44 | 1.44 | 2.52 | 6.66 | 0.126 |

Figure 6:
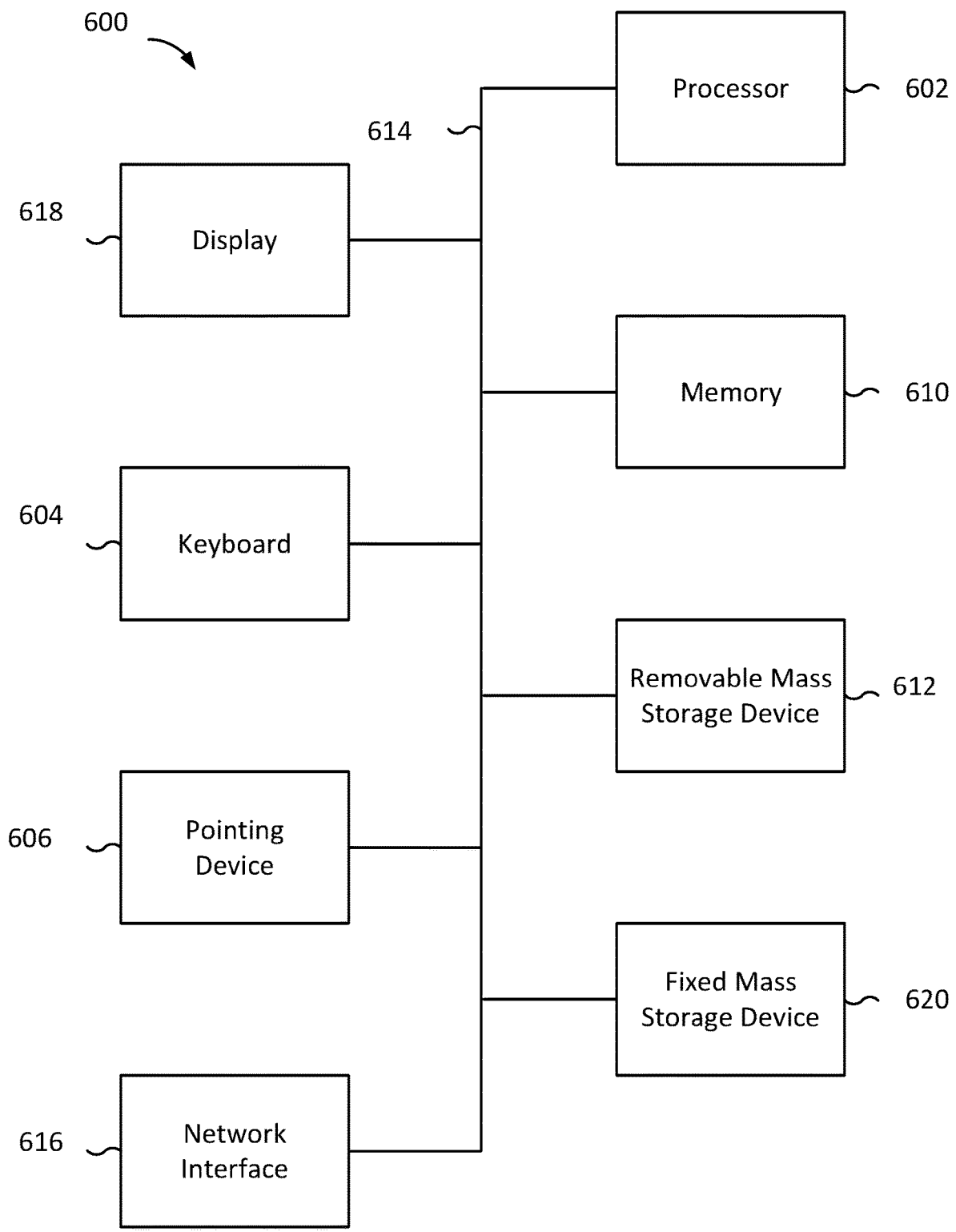
FIG. 6 is a functional diagram of a computer system according to various embodiments of the present application.

FIG. 6 is a functional diagram of a computer system according to various embodiments of the present application.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Each of the embodiments contained in this specification is described in a progressive manner. The explanation of each embodiment focuses on areas of difference from the other embodiments, and the descriptions thereof may be mutually referenced regarding portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, an embodiment of the present application may take the form of one or more computer program products implemented on computer-usable storage media (including but not limited to magnetic disk memory, CD-ROM, and optical memory) containing computer-usable program code.

The embodiments of the present application are described with reference to flowcharts and/or block diagrams based on methods, terminal devices (systems), and computer program products of the embodiments of the present application. Please note that each process and/or block within the flowcharts and/or block diagrams and combinations of processes and/or blocks within the flowcharts and/or block diagrams can be implemented by computer instructions. These computer program commands can be provided to the processors of general-purpose computers, specialized computers, embedded processor devices, or other programmable data-processing terminals to produce a machine. The commands executed by the processors of the computers or other programmable data-processing terminal devices consequently give rise to means for implementing the functions specified in one or more processes in the flowcharts and/or one or more blocks in the block diagrams.

These computer program commands can also be stored in computer-readable memory that can guide the computers or other programmable data-processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data-processing terminal devices and made to execute a series of steps on the computers or other programmable data-processing terminal devices so as to give rise to computer-implemented processing. The commands executed on the computers or other programmable data-processing terminal devices thereby provide the steps of the functions specified in one or more processes in the flowcharts and/or one or more blocks in the block diagrams.

Although the present application uses preferred embodiments to disclose the above, they are not used to limit the present application. Any person skilled in the art may make possible changes and modifications without departing from the spirit and scope of the present application. Therefore, the scope of protection of the present application shall be the scope delimited by the claims of the present application.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media do not include non-temporary computer-readable media (transitory media) such as modulated data signals and carrier waves.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining, by one or more processors, an image;
extracting, by the one or more processors, residual data of the image from the image, wherein the residual data is extracted based at least in part on an output of a plurality of difference filters corresponding to different directions;

obtaining, by the one or more processors, a feature map of at least two neural network layers based at least in part on the residual data of the image;

obtaining, by the one or more processors, a tamper probability map of the image based at least in part on the feature map; and outputting the tamper probability map or providing an indication of whether the image was subject to tampering based at least in part on the tamper probability map.

2. The method of claim 1, wherein the providing the indication of whether the image was subject to tampering comprises:

providing, by the one or more processors, information pertaining to a likelihood that the image has been subject to tampering, the information being based at least in part on the tamper probability map, and the information being provided to a user, wherein the information pertaining to the likelihood that the image has been subject to tampering is provided on a user interface of a client terminal used by the user.

3. The method of claim 1, wherein the image is obtained in response to a user invoking a function to test whether the image is genuine.

4. The method of claim 1, wherein the extracting residual data of the image comprises:

performing a filter processing with respect to the image; and obtaining residual data of a filtered image output by the filter processing, wherein the output by the filter processing is based at least in part on the output of the plurality of difference filters.

5. The method of claim 4, wherein the performing the filter processing with respect to the image and obtaining the residual data collectively comprises:

performing the filtering processing with respect to the image based at least in part on the plurality of difference filters corresponding to different directions; and obtaining the residual data of the filtered image based at least in part on an output of the plurality of difference filters.

6. The method of claim 4, wherein the performing the filter processing with respect to the image and obtaining the residual data collectively comprises:

performing the filtering processing with respect to the image based at least in part on the plurality of difference filters corresponding to different directions, wherein the plurality of difference filters individually subject different color channels of the image to convolution operations;

obtaining convolution operation results for the different color channels of the image; and obtaining residual data of the filtered image based at least in part on the convolution operation results for the different color channels of the image.

7. The method of claim 1, wherein the obtaining the feature map comprises:

performing a convolution processing with respect to input data of a current layer;

obtain a first feature map based at least in part on results of convolution processing with respect to input data of a current layer to the convolution processing, wherein if the current layer is a first layer of a residual network, the input data of the current layer is the residual data of the image; and obtaining a feature map of the current layer based at least in part on an adding of the input data and the first feature map.

8. The method of claim 7, further comprising:

performing normalization and nonlinear processing with respect to the input data, wherein the performing the convolution processing with respect to input data of the current layer and the obtaining the first feature map collectively comprises:

performing convolution processing with respect to normalized and nonlinear processed input data; and obtaining the first feature map based at least in part on the convolution processing with respect to normalized and nonlinear processed input data.

9. The method claim 7, further comprising:

obtaining processed input data based at least in part on processing a resolution or a number of channels of the input data, wherein:

the processed input data is the same as a resolution and a number of channels of the first feature map; and the obtaining the feature map of the current layer based at least in part on the adding of the input data and the first feature map comprises: obtaining the feature map of the current layer based at least in part on adding the processed input data and the first feature map.

10. The method of claim 9, wherein the obtaining the processed input data based at least in part on processing a resolution or a number of channels of the input data comprises:

adjusting the resolution of the input data based at least in part on a max pooling operation; or adjusting the number of channels of the input data based at least in part on using a convolutional kernel having predetermined dimensions.

11. The method of claim 7, wherein the performing the convolution processing with respect to the input data of the current layer and the obtaining the first feature map collectively comprises:

performing convolution processing with respect to the input data based at least in part on three convolutional layers; and obtaining the first feature map based at least in part on the convolution processing performed with respect to the three convolution layers, and wherein a stride of a last convolutional layer of the three convolutional layers is 2.

12. The method of claim 1, wherein the obtaining the feature map comprises:

performing a convolution processing with respect to input data of a current layer to the convolution processing;

obtain a first feature map based at least in part on results of convolution processing with respect to input data of a current layer to the convolution processing, wherein if the current layer is a layer other than a first layer, the input data of the current layer is a first feature map output by a previous-layer residual network module; and obtaining a feature map of the current layer based at least in part on an adding of the input data and the first feature map.

13. The method of claim 1, wherein the obtaining the tamper probability map of the image based at least in part on the feature map comprises:
  obtaining the tamper probability map of the image based at least in part on performing an upsampling processing with respect to the feature map.

14. The method of claim 13, wherein a resolution of the tamper probability map and a resolution of the image are the same.

15. The method of claim 13, wherein the performing the upsampling processing with respect to the feature map comprises:
  performing upsampling processing with respect to the feature map based at least in part on a transposed convolution layer.

16. The method of claim 15, wherein a convolutional kernel of the transposed convolutional layer comprises one or more parameters corresponding to bilinear interpolation, and dimensions of a convolutional kernel of the transposed convolutional layer are double dimensions of an upsampling factor of the upsampling processing.

17. The method claim 13, wherein obtaining the tamper probability map of the image based at least in part on performing an upsampling processing with respect to the feature map comprises:
  performing upsampling sub-processing with respect to the feature map at least two times; and
  obtaining the tamper probability map of the image based at least in part on results of the upsampling sub-processing, wherein a product of an upsampling factors of the upsampling sub-processing performed at least two times is an upsampling factor of the upsampling processing.

18. The method of claim 13, obtaining the tamper probability map of the image based at least in part on performing an upsampling processing with respect to the feature map comprises:
  performing upsampling processing with respect to the feature map;
  obtaining an upsampled feature map based at least in part on results of the upsampling processing performed with respect to the feature map;
  performing a convolution operation on the upsampled feature map; and
  obtaining the tamper probability map of the image based at least in part on results of the convolution operation.

19. A device, comprising:
  one or more processors configured to:
    obtain an image;
    extract residual data of the image from the image, wherein the residual data is extracted based at least in part on an output of a plurality of difference filters corresponding to different directions;
    obtain a feature map of at least two neural network layers based at least in part on the residual data of the image;
    obtain a tamper probability map of the image based at least in part on the feature map; and
    output the tamper probability map or provide an indication of whether the image was subject to tampering based at least in part on the tamper probability map; and
  one or more memories coupled to the one or more processors, configured to provide the one or more processors with instructions.

20. A computer program product, the computer program product being embodied in a non-transitory computer readable storage medium and comprising computer instructions for:
  obtaining, by one or more processors, an image;
  extracting, by the one or more processors, residual data of the image from the image, wherein the residual data is extracted based at least in part on an output of a plurality of difference filters corresponding to different directions;
  obtaining, by the one or more processors, a feature map of at least two neural network layers based at least in part on the residual data of the image;
  obtaining, by the one or more processors, a tamper probability map of the image based at least in part on the feature map; and
  outputting the tamper probability map or providing an indication of whether the image was subject to tampering based at least in part on the tamper probability map.

* * * * *

UNITED STATES PATENT AND TRADEMARK OFFICE
CERTIFICATE OF CORRECTION

PATENT NO. : 11,354,797 B2  
APPLICATION NO. : 16/804446  
DATED : June 7, 2022  
INVENTOR(S) : Haodong Li et al.

Page 1 of 1

It is certified that error appears in the above-identified patent and that said Letters Patent is hereby corrected as shown below:

On the Title Page

Item (73), assignee, address, insert --, George Town (KY)--.

Signed and Sealed this  
Fourth Day of October, 2022

Katherine Kelly Vidal  
*Director of the United States Patent and Trademark Office*